(12) United States Patent
Lee et al.

(10) Patent No.: US 8,774,951 B2
(45) Date of Patent: Jul. 8, 2014

(54) SYSTEM AND METHOD FOR ENHANCED MEDIA PLAYBACK

(75) Inventors: Michael M. Lee, San Jose, CA (US);
Jay F. Hamlin, Santa Cruz, CA (US);
Christopher P. Dudte, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1709 days.

(21) Appl. No.: 11/612,029

(22) Filed: Dec. 18, 2006

(65) Prior Publication Data

US 2008/0147214 A1 Jun. 19, 2008

(51) Int. Cl.
*G06F 17/00* (2006.01)
*H04H 20/47* (2008.01)
*H04B 3/00* (2006.01)
*H04M 11/00* (2006.01)
*H04H 40/00* (2008.01)

(52) U.S. Cl.
USPC ............... 700/94; 381/2; 381/77; 455/3.06; 379/101.01

(58) Field of Classification Search
USPC .............. 700/94; 455/3.06, 413; 379/93.24, 379/265.09, 101.01, 88.17; 381/2, 77
See application file for complete search history.

(56) References Cited

U.S. PATENT DOCUMENTS

| | | | |
|---|---|---|---|
| 6,199,076 B1 * | 3/2001 | Logan et al. .................. 715/203 |
| 6,237,022 B1 * | 5/2001 | Bruck et al. .................. 709/201 |
| 6,993,290 B1 * | 1/2006 | Gebis et al. .................... 455/45 |
| 7,216,008 B2 * | 5/2007 | Sakata ............................ 700/94 |
| 7,216,221 B2 * | 5/2007 | Bear et al. ........................ 713/1 |
| 7,243,104 B2 * | 7/2007 | Bill ........................................ 1/1 |
| 7,567,846 B2 * | 7/2009 | Sztybel .......................... 700/94 |
| 7,693,992 B2 * | 4/2010 | Watson ......................... 709/226 |
| 7,720,686 B2 * | 5/2010 | Volk et al. ...................... 700/94 |
| 7,817,587 B2 * | 10/2010 | Vasa et al. ...................... 370/310 |
| 2002/0083184 A1 * | 6/2002 | Elliott ........................... 709/232 |
| 2003/0120541 A1 * | 6/2003 | Siann et al. .................... 705/14 |
| 2003/0172381 A1 * | 9/2003 | Janevski ......................... 725/46 |
| 2004/0133467 A1 * | 7/2004 | Siler .............................. 705/14 |
| 2005/0174889 A1 * | 8/2005 | Marcantonio et al. .......... 368/12 |
| 2007/0098351 A1 * | 5/2007 | East et al. ....................... 386/46 |
| 2007/0294773 A1 * | 12/2007 | Hydrie et al. .................. 726/27 |
| 2008/0065988 A1 * | 3/2008 | Gupta et al. ................... 715/716 |

OTHER PUBLICATIONS

U.S. Appl. No. 11/585,721, filed Oct. 23, 2006.

* cited by examiner

*Primary Examiner* — Davetta W Goins
*Assistant Examiner* — Daniel Sellers
(74) *Attorney, Agent, or Firm* — Fletcher Yoder PC

(57) ABSTRACT

Systems and methods for enhanced media playback are disclosed. According to one aspect, during media playback, auxiliary (or secondary) media can be integrated with primary media. For example, an electronic device offering media playback can not only play back media item data but can also play back other auxiliary media data. In one implementation, presentation of a media group can involve not only presentation of media items of the media group but also presentation of auxiliary media. Another aspect pertains to how and when auxiliary media data is to be presented (e.g., played) by an electronic device. Another aspect pertains to updating or refreshing auxiliary media data. Still another aspect pertains to restricting presentation of primary media by an electronic device unless auxiliary data is also presented.

17 Claims, 12 Drawing Sheets

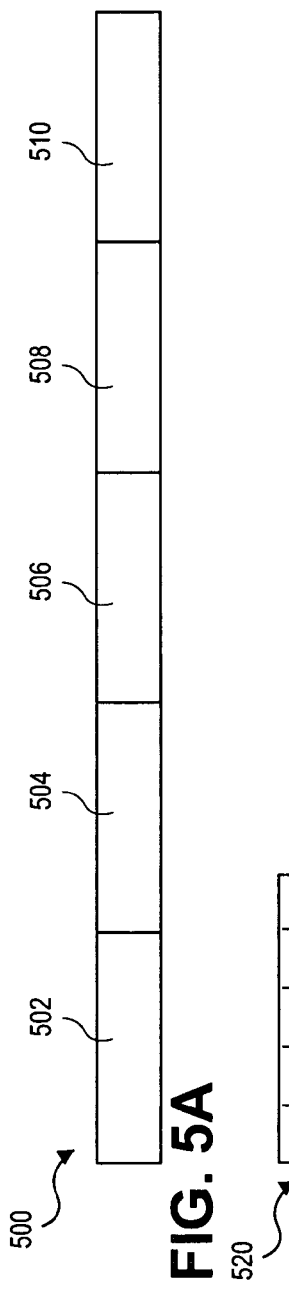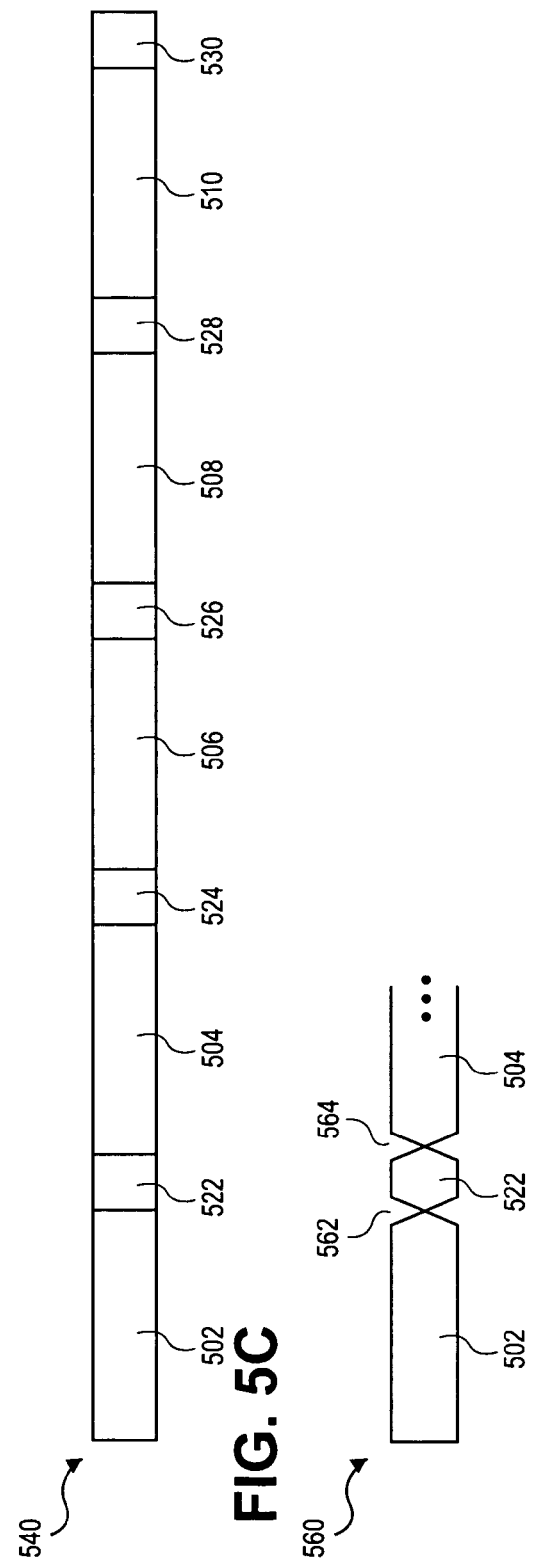
FIG. 5A
FIG. 5B
FIG. 5C
FIG. 5D

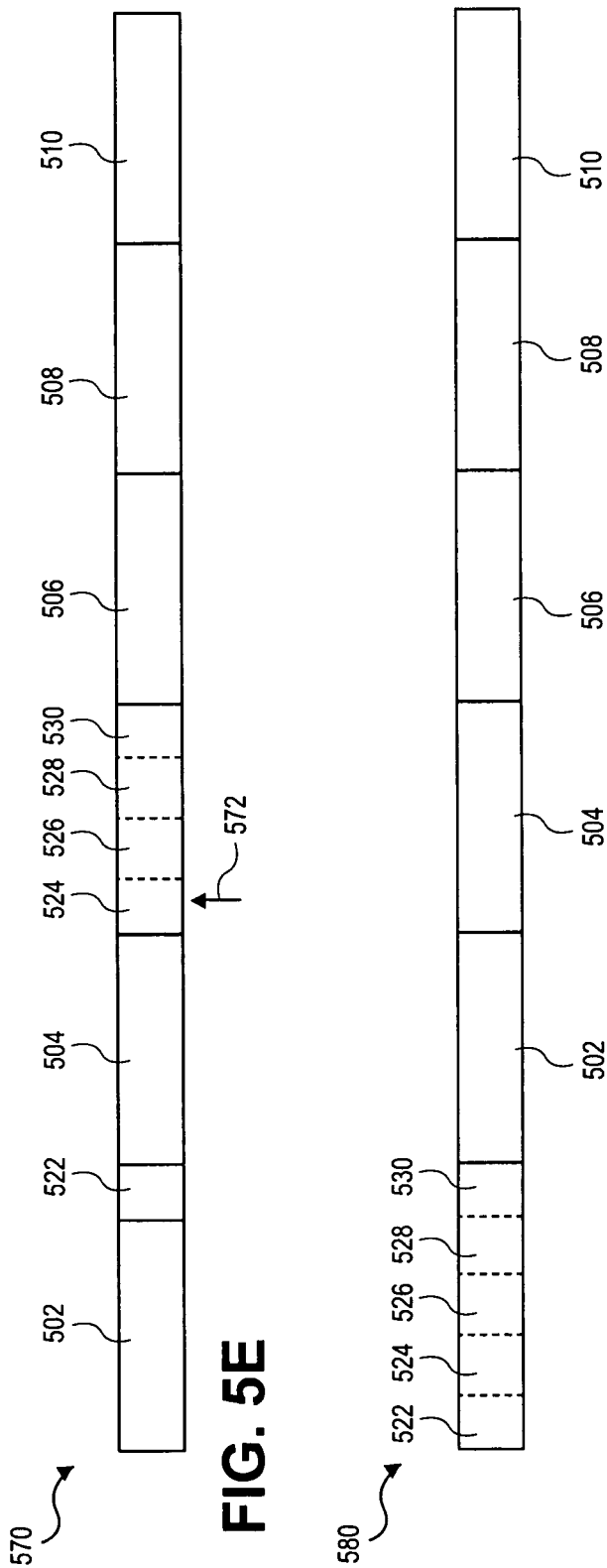

SYSTEM AND METHOD FOR ENHANCED MEDIA PLAYBACK

BACKGROUND OF THE INVENTION

1. Field of the Invention

The present invention relates to providing media playback on electronic devices.

2. Description of the Related Art

Some portable media players store media assets, such as audio or video tracks, that can be played by the portable media player. One example of a portable media player is the iPod® media player, which is available from Apple Computer, Inc. of Cupertino, Calif. Often, a media player acquires its media assets from a host computer that serves to enable a user to store and manage media assets. In managing media assets, a user can create playlists for audio or video tracks. These playlists can be created at the host computer. Media assets within the playlists can then be copied to the portable media player. As an example, the host computer can execute a media management application to manage media assets. One example of a media management application is iTunes® produced by Apple Computer, Inc.

Conventionally, a portable media player is capable of playing media, such as audio (e.g., songs) or video (e.g., movies) for the benefit of its user. When playing audio, if the portable media player includes a display, the display can present the name of the song, artist and other information pertaining to the song. In the case of playing a video, the display can be used to present the video.

Podcasts are typically used to share content from websites. Podcasts are associated with Really Simple Syndication (RSS) feeds which use a lightweight XML format. A podcast can be organized into episodes much like a radio or television program. An interested person can subscribe to receive podcast episodes that are subsequently published. This is achieved by the interested person using their computer to access a podcast website that hosts the RSS feed. The interested person can then subscribe to the RSS feed such that their computer occasionally re-visits the podcast website to check for any new podcast episodes. Typically, if a new podcast episode is available, it is downloaded to the computer. Thereafter, the interested user can play the podcast episode at their computer in the same manner as other audio files (e.g., MP3 files). A utility program can be used to download the audio files to a portable media player (e.g., MP3 player).

Unfortunately, however, portable media players are generally not able to dynamically modify or control media item playback. For example, when playing a series of media items from a media item group (e.g., playlist), a portable media player merely sequences through the fixed set of media items. Although playback can be stopped, the media being played is nevertheless limited to play back of the media items within the media item group.

Thus, there is a need for improved techniques to provide media playback by portable media players.

SUMMARY OF THE INVENTION

The invention can pertain to systems and methods for enhanced media playback. According to one aspect of the invention, during media playback, auxiliary (or secondary) media can be integrated with primary media. For example, an electronic device offering media playback can not only play back media item data but can also play back other auxiliary media data. In one implementation, presentation of a media group can involve not only presentation of media items of the media group but also presentation of auxiliary media. Another aspect of the invention pertains to how and when auxiliary media data is to be presented (e.g., played) by an electronic device. Another aspect of the invention pertains to updating or refreshing auxiliary media data. Still another aspect of the invention pertains to restricting presentation of primary media by an electronic device unless auxiliary data is also presented. These and other various aspects of the invention can be used separately or in any combination.

The invention can be implemented in numerous ways, including as a method, system, device, apparatus (including graphical user interface), or computer readable medium. Several embodiments of the invention are discussed below.

As a method for presenting media by a media playback device, one embodiment of the invention can include at least the acts of: receiving a playback request to play a media group, the media group including a plurality of media items; determining whether auxiliary media is also to be played back; playing back media items from the media group; and playing the auxiliary media if determined that the auxiliary media is also to be played back.

As a computer readable medium including at least computer program code for presenting media by a media playback device, one embodiment of the invention can include at least: computer program code for determining whether a media group is to be presented, the media group including a plurality of media items; computer program code for determining whether secondary media is also to be presented; computer program code for presenting the media items from the media group when it is determined that the media group is to be presented; and computer program code for presenting the secondary media when it is determined that the secondary media is also to be presented.

As an electronic device, one embodiment of the invention can include at least a data storage device and a media playback subsystem. The data storage device stores at least a portion of primary media data and auxiliary media data. The primary media data can include a plurality of media items, and the auxiliary media data can include a plurality of auxiliary media items. The media playback subsystem can operate to playback two or more of the media items while interspersing playback of at least one of the auxiliary media items between playback of at least two of the media items.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 5A is a diagram of a conventional playback of a media group.

FIG. 5B is a diagram of a secondary media package according to one embodiment of the invention.

FIG. 5C is a diagram of playback of interlaced media data according to one embodiment of the invention.

FIG. 5D is a diagram of playback of interlaced media data according to another embodiment of the invention.

FIG. 5E is a diagram of playback of mixed media data according to one embodiment of the invention.

FIG. 5F is a diagram of playback of mixed media data according to another embodiment of the invention.

DETAILED DESCRIPTION OF THE INVENTION

Figure 1:
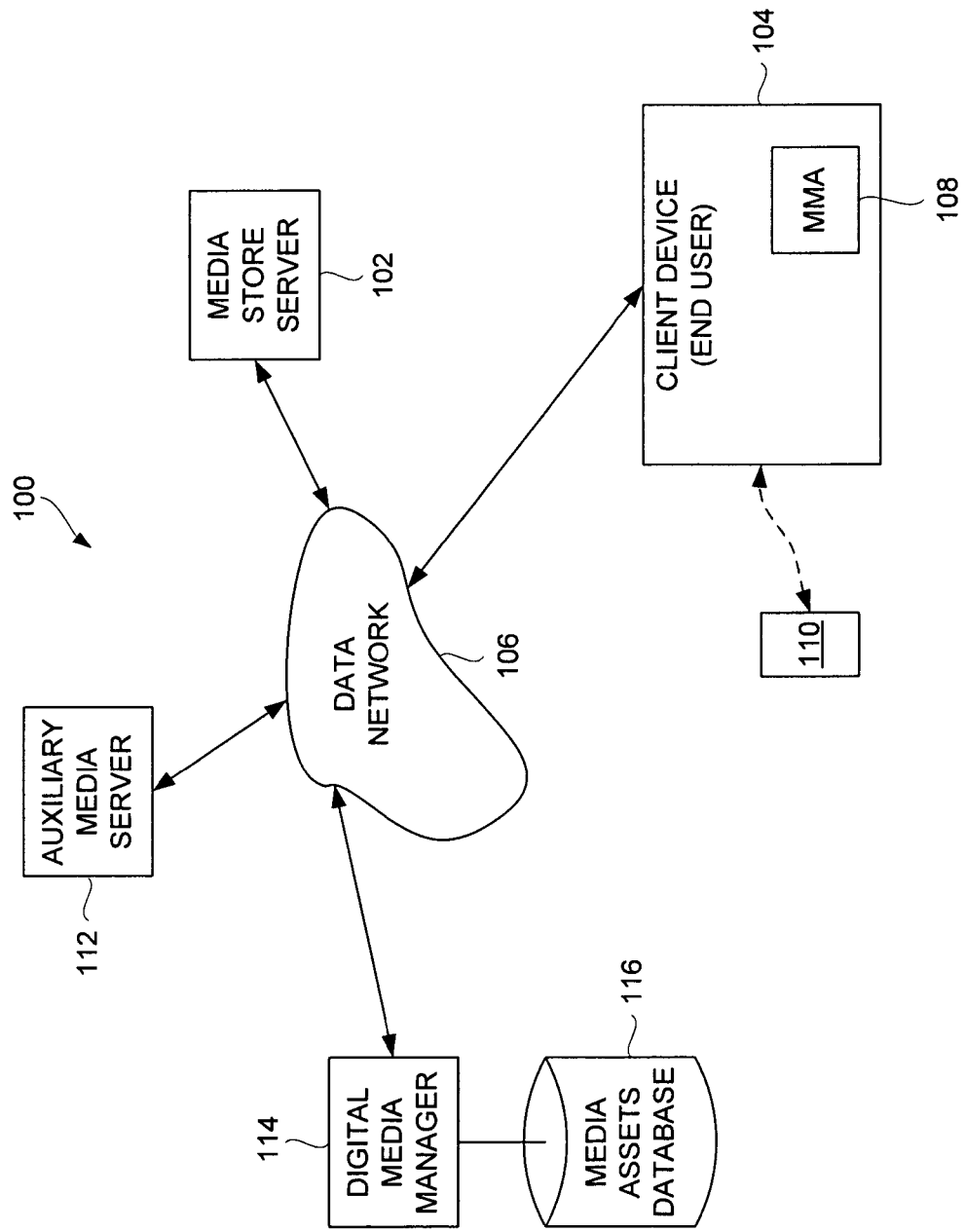
FIG. 1 is a block diagram of a media system according to one embodiment of the invention.

The invention can pertain to systems and methods for enhanced media playback. According to one aspect of the invention, during media playback, auxiliary (or secondary) media can be integrated with primary media. For example, an electronic device offering media playback can not only play back media item data but can also play back other auxiliary media data. In one implementation, presentation of a media group can involve not only presentation of media items of the media group but also presentation of auxiliary media. Another aspect of the invention pertains to how and when auxiliary media data is to be presented (e.g., played) by an electronic device. Another aspect of the invention pertains to updating or refreshing auxiliary media data. Still another aspect of the invention pertains to restricting presentation of primary media by an electronic device unless auxiliary data is also presented. These and other various aspects of the invention can be used separately or in any combination.

The invention can be well suited for electronic devices having audio playback capabilities, such as portable media devices (e.g., digital media players or MP3 players) or other portable multi-function devices (e.g., mobile telephone or Personal Digital Assistant). For example, portable devices can often store and play digital media assets (media items), such as music (e.g., songs), videos (e.g., movies), audiobooks, podcasts, meeting recordings, and/or other multimedia recordings. Portable devices, such as portable media players or other portable multi-function devices, can also be small and highly portable and have limited processing resources. Often, portable devices are hand-held devices, such as hand-held media players or hand-held multi-function devices, which can be easily held by and within a single hand of a user. Portable devices can also be pocket-sized, miniaturized or wearable.

Embodiments of the invention are discussed below with reference to FIGS. 1-9. However, those skilled in the art will readily appreciate that the detailed description given herein with respect to these figures is for explanatory purposes as the invention extends beyond these limited embodiments.

According to one aspect of the invention, during media playback, auxiliary (or secondary) media can be integrated with primary media. For example, an electronic device offering media playback can not only play back media item data but can also play back other auxiliary media data. In one implementation, presentation of a media group can involve not only presentation of media items of the media group but also presentation of auxiliary media.

A user of a portable media player may find it useful to have other information presented to them while playing media items. For example, while a portable media player is playing a group of songs for a user, the user may wish to integrate short segments of auxiliary media, such as news, sports or business information, between one or more of the songs. In this example, the group of songs is the primary media, whereas the news, sports or business information is the auxiliary media. For example, the group of songs can, for example, be a playlist (audio playlist). As another example, while a portable media player is playing a group of short videos for a user, the user may wish to integrate short segments of auxiliary media, such as news, sports or business information, between one or more of the short videos. In this example, the group of short videos is the primary media, whereas the news, sports or business information is the auxiliary media. For example, the group of videos can, for example, be a playlist (video playlist). The auxiliary media can be the same type or a different type of media than the primary media.

In one embodiment, auxiliary media is media that is informative media as opposed to entertainment media. Informative media can include, for example, news, sports or business information. In contrast, entertainment media can be songs, movies, audiobooks, music videos, etc. In another embodiment, auxiliary media can include contact or schedule information (e.g., to-do lists, calendars, and or appointments) associated with a user. In still another embodiment, auxiliary media can include voice messages, such as when the portable media player supports wireless voice communications.

FIG. 1 is a block diagram of media system 100 according to one embodiment of the invention. Media system 100 can include media store server 102 that hosts an on-line media store. Media store server 102 can off-load commerce transactions and/or delivery of purchased digital media assets to other servers, if desired. As shown in FIG. 1, media system 100 includes one or more client devices 104 for use by end users. Client devices 104 couple to data network 106. Additionally, media store server 102 also couples to data network 106. In one implementation, data network 106 can refer to one or more data networks, typically, high data-bandwidth networks, namely, wired networks, such as the Internet, ethernet, gigabit ethernet, and fiber optic, as well as wireless networks such as IEEE 802.11(a), (b) or (g) (WiFi), IEEE 802.16 (WiMax), and Ultra-Wide Band (UWB).

Computer program 108 (client or client application), typically a media management application (MMA) or other media player application, can run on client device 104. Client devices 104 are, in general, computing devices. As an example, client devices 104 can be specific or general-purpose personal computers (or even portable media players). Client device 104 can couple to portable media device 110 (e.g., portable media player). Computer program 108 can be used by a consumer for a variety of purposes, including, but not limited to, browsing, searching, acquiring and/or purchasing media assets (i.e., digital media assets) via the on-line media store provided by media store server 102, creating and sharing media asset groups (or media groups) (e.g., playlists), organizing media assets, presenting/playing media assets, transferring media assets between client devices 104, and synchronizing with portable media devices 110.

Media system 100 can also include auxiliary media server 112. Auxiliary media server 112 can serve as a media repository for auxiliary media. In one embodiment, the auxiliary media refers to secondary media. Auxiliary media server 112 can couple to data network 106.

In one embodiment, when a media item or a media group is purchased or acquired from the online music store hosted by media store server 102, the media item or media group can be delivered (downloaded) to client device 104. In such a case, media management application 108 can store the media item or media group into a media library stored on client device 104. In addition, media management application 108 can transfer some or all of the media items or media groups from the media library to portable media device 110.

Additionally, media system 100 can also provide auxiliary media to client device 104. For example, auxiliary media server 112 can supply auxiliary media to client device 104. In one implementation, the auxiliary media is specified or influenced by the media item or media group itself when being acquired from media store server 102. In another implementation, the auxiliary media can be determined or influenced by auxiliary media server 112. For example, auxiliary media server 112 can select appropriate auxiliary media from an auxiliary media repository provided by auxiliary media server 112. The selected auxiliary media can then be delivered to client device 104. In still another implementation, media store server 102 can determine characteristics or specific auxiliary media to be provided to client device 104. The auxiliary media can be stored by client device 104. For example, the media management application 108 can store the auxiliary media in a media library residing on client device 104. Client device 104 can present not only media items but also auxiliary media at client 104. Similarly, some or all of the auxiliary media that has been stored to client device 104 can be transmitted and stored at portable electronic device 110. Thereafter, portable electronic device 110 can operate to present not only a particular media item but also auxiliary media. The auxiliary data can be selected in various ways as noted above. The processing to select the auxiliary media can be performed on client device 104 or on portable electronic device 110.

In addition, media system 100 can further be operated to update or refresh auxiliary media data that has been previously delivered to client device 104 and/or portable electronic device 110. For example, if, on acquisition of a media item or media group from media store server 102, auxiliary media is identified and also acquired. The acquired auxiliary media can then be stored to client device 104 and potentially further stored at portable electronic device 110. Thereafter, client device 104 and/or portable electronic device 110 can present media items as well as auxiliary media. In one implementation, it is advantageous to update or refresh the auxiliary media to be played at client device 104 or portable electronic device 110 so that the auxiliary media does not become stagnant. In this regard, client device 104 can interact with auxiliary media server 112 to update or replace auxiliary media that can be delivered to client device 104 and used in place of previously utilized auxiliary media at client device 104. The updated or refreshed auxiliary media can also be further delivered to portable electronic device 110 via client device 104.

Media system 100 can also include digital asset manager 114. Digital asset manager 114 can be coupled to a media assets database 116. Media assets database 116 can store media asset information including metadata relating to digital media assets available for purchase at the on-line media store. The metadata can pertain to individual media assets (digital media assets) or media asset groups (digital media asset groups). Media assets can include, but are not limited to, music, video, text, and/or graphics files. A media asset group can be a playlist. An album, such as an album of songs, is one type of playlist.

Media store server 102 can enable the user of a particular client device 104 to acquire media assets. Subsequently, client device 104 can download the media assets from media store server 102, auxiliary media server 112 or some other server, via data network 106. As will be understood by those familiar with data networks, other network configurations are possible. Furthermore, while media store server 102, auxiliary media server 112 and digital asset manager 114 are shown as individual and separate devices, it will be understood by those familiar with the art that other configurations are possible. As one example, each device can be implemented such that it is distributed over multiple server computers. As another example, these various servers and/or managers can be implemented by a single physical server computer.

Figure 2:
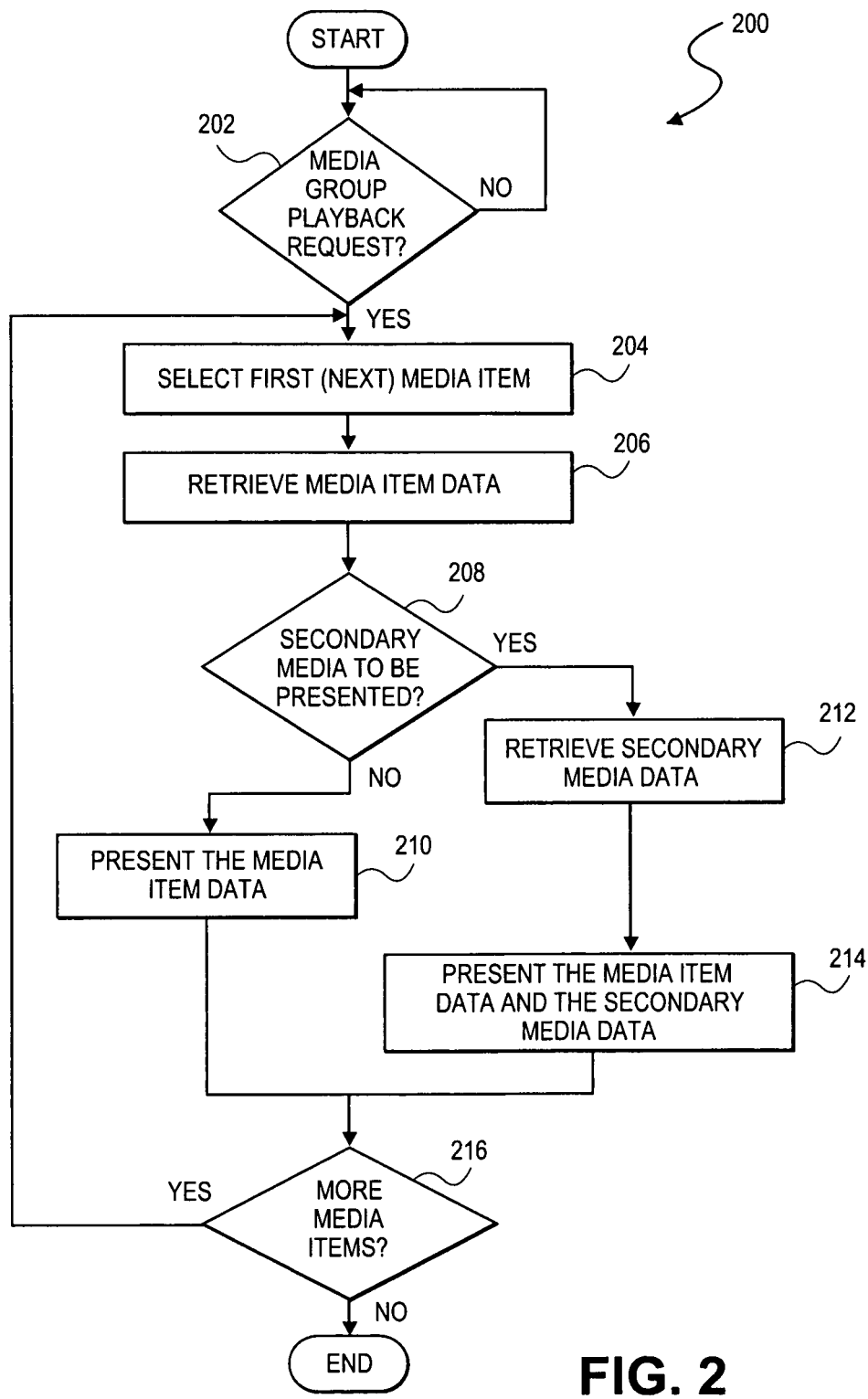
FIG. 2 is a flow diagram of a media playback process according to one embodiment of the invention.

FIG. 2 is a flow diagram of media playback process 200 according to one embodiment of the invention. Media playback process 200 is, for example, performed by a computing device. The computing device can, for example, be client device 104 or portable media device 110 of media system 100 illustrated in FIG. 1.

Media playback process 200 can begin with a decision 202. Decision 202 can determine whether playback of a media group has been requested. As an example, a user interacting with a computing device can request media group playback. As an example, a media group can be a set of media items, such as an album. When decision 202 determines that playback of a media group has not been requested, media playback process 200 can await such a request. On the other hand, when decision 202 determines that playback of a media group has been requested, media playback process 200 can continue. In other words, media playback process 200 can be effectively invoked when a playback request for a media group is received.

Once decision 202 determines that a media group playback request has been received, a first media item can be selected 204. Media item data corresponding to the selected media item can then be retrieved 206. The selected media item can be deemed the primary media to be presented. Next, decision 208 determines whether secondary media is to be presented. When decision 208 determines that secondary media is not to be presented, the media item data can be presented 210. In this case, the media item data associated with the selected media item can be presented 210. Since there is no secondary media to be presented, only the media item data is presented 210 by the media playback process 200. In one implementation, presenting 210 can pertain to displaying of the media item data.

Alternatively, when decision 208 determines that secondary media is to be presented, secondary media data can be retrieved 212. The secondary media is other media (i.e., non-media item) that can be presented. For example, the secondary media can pertain to news or advertising information. Advertising information can pertain to specific products, services, shows or events. The secondary media data being retrieved 212 can vary depending upon implementation. For example, the secondary media data can be associated with the media group or the selected media item. Alternatively, the secondary media data can be randomly chosen from a plurality of different secondary media items. As other alternatives, the secondary media data can be selected or influenced by usage history, user preferences, device configurations, or playback rules from a third-party (e.g., remote media provider). After the secondary media data has been retrieved 212, the media item data and the secondary media data can be presented 214. Here, both the media item data and the secondary media data can be presented 214. In one implementation, presenting 214 can pertain to displaying of the media item data and the secondary media data. Presenting 214 of the media item data and the secondary media data can also be achieved in a variety of different ways. Several embodiments of presenting 214 are described below with reference to FIGS. 4A-4C and FIGS. 5A-5F.

Following blocks 210 and 214, decision 216 determines whether there are more media items within the media group to be processed. When decision 216 determines that there are more media items within the media group to be processed, media playback process 200 can return to repeat block 204 and subsequent blocks so that the other one or more media items within the media group can be processed in a similar manner. On returning to block 204, a next media item can be selected for processing in blocks 206-214. Alternatively, when decision 216 determines that there are no more media items within the media group to be processed, media playback process 200 can end.

Figure 3:
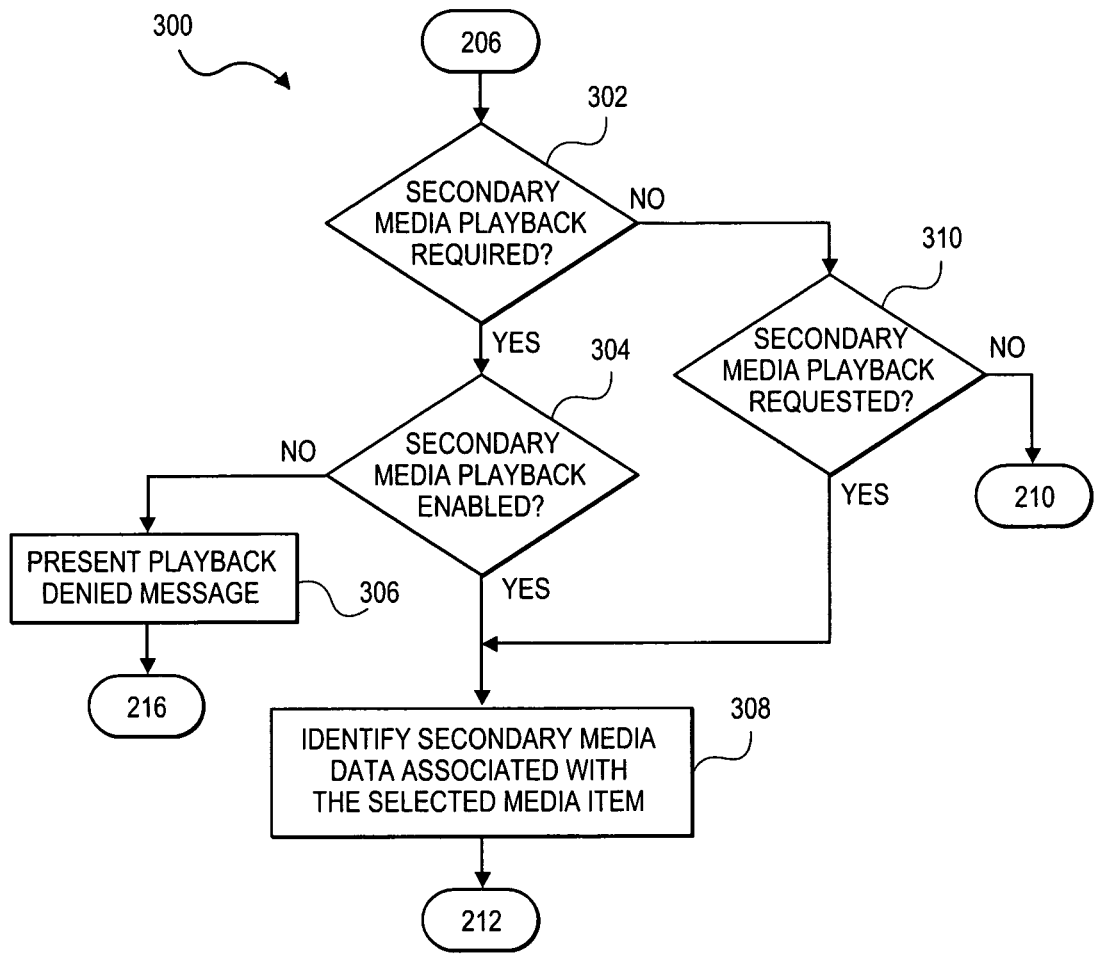
FIG. 3 is a flow diagram of a secondary media playback process according to one embodiment of the invention.

FIG. 3 is a flow diagram of secondary media playback process 300 according to one embodiment of the invention. Secondary media playback process 300 is, for example, processing suitable for implementing one embodiment of decision 208 illustrated in FIG. 2.

Secondary media playback process 300 begins with decision 302. Decision 302 determines whether secondary media playback is required. When decision 302 determines that secondary media playback is required, decision 304 can determine whether secondary media playback is enabled. Here, in one embodiment, the computing device that performs secondary media playback process 300 can enable or disable playback of secondary media. As one example, the computing device can be controlled to enable or disable secondary media playback. As another example, a device configuration or user preference can be set by a user to enable or disable secondary media playback. When decision 304 determines that secondary media playback has been disabled, a playback denied message can be presented 306. Following block 306, secondary media playback process 300 can return to decision 216 of media playback process 200.

On the other hand, when decision 304 determines that secondary media playback is enabled on the computing device, secondary media data associated with the selected media item can be identified 308. Following block 308, secondary media playback process 300 can return to block 212 of media playback process 200.

Alternatively, when decision 302 determines that secondary media playback is not required, decision 310 can determine whether secondary media playback is requested. When decision 310 determines that secondary media playback is requested, secondary media playback process 300 can perform block 308 as discussed above. On the other hand, when decision 310 determines that secondary media playback is not requested, then secondary media playback process 300 can return to block 210 of media playback process 200 so that the media item data can be presented without presenting any secondary media data.

Another aspect of the invention pertains to how and when auxiliary media data is to be presented (e.g., played) by an electronic device. Typically, but not necessarily, the presentation of auxiliary media data is provided when the presentation of primary media data is not being presented, such as between presentation of distinct media items. The presentation can be controlled or influenced by user preferences, usage history, media item characteristics, availability of auxiliary data, or system configuration settings. In one embodiment, once enabled or activated, the presentation of auxiliary media data can be automatically provided.

Figure 4A:
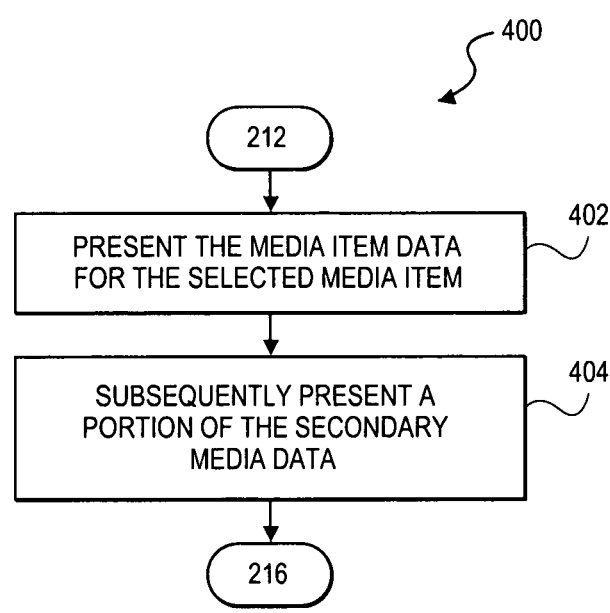
FIG. 4A is a flow diagram of a media presentation process according to one embodiment of the invention.

FIG. 4A is a flow diagram of media presentation process 400 according to one embodiment of the invention. Media presentation process 400 can be, for example, a process performed by block 214 of media playback process 200 illustrated in FIG. 2. Media presentation process 400 presents 402 media item data for the selected media item. After the media item data for the selected media item is presented 402, a portion of the secondary media data can be presented 404. Following block 404, media presentation process 400 can return to repeat block 216 of media playback process 200 illustrated in FIG. 2. Accordingly, in this embodiment, secondary media data can be interspersed between media item data for different media items.

Figure 4B:
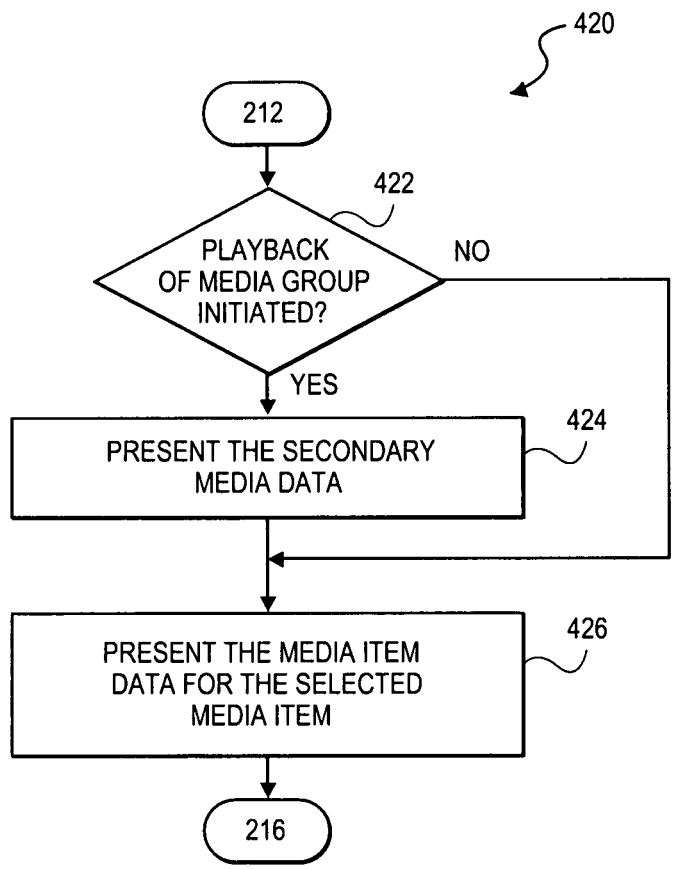
FIG. 4B is a flow diagram of a media presentation process according to another embodiment of the invention.

FIG. 4B is a flow diagram of media presentation process 420 according to another embodiment of the invention. Media presentation process 420 can be, for example, a process performed by block 214 of media playback process 200 illustrated in FIG. 2. Media presentation process 420 begins with decision 422. Decision 422 determines whether playback of the media group has been initiated. In other words, decision 422 determines whether the media group is being newly played back. When decision 422 determines that the media group is now initiated for playback, the secondary media data is presented 424. In one implementation, the secondary media data is presented in its entirety prior to presenting the media item data. Alternatively, once decision 422 determines that playback of the media group has not been newly initiated, block 424 can be bypassed. Following block 424, or its being bypassed, the media item data for the selected media item can be presented 426. Following block 426, media presentation process 420 can return to repeat block 216 of media playback process 200. In this embodiment, the secondary media data can be presented before presenting any of the media item data for a media group. In an alternative embodiment, the secondary media data can be presented after presenting all of the media item data for a media group.

Figure 4C:
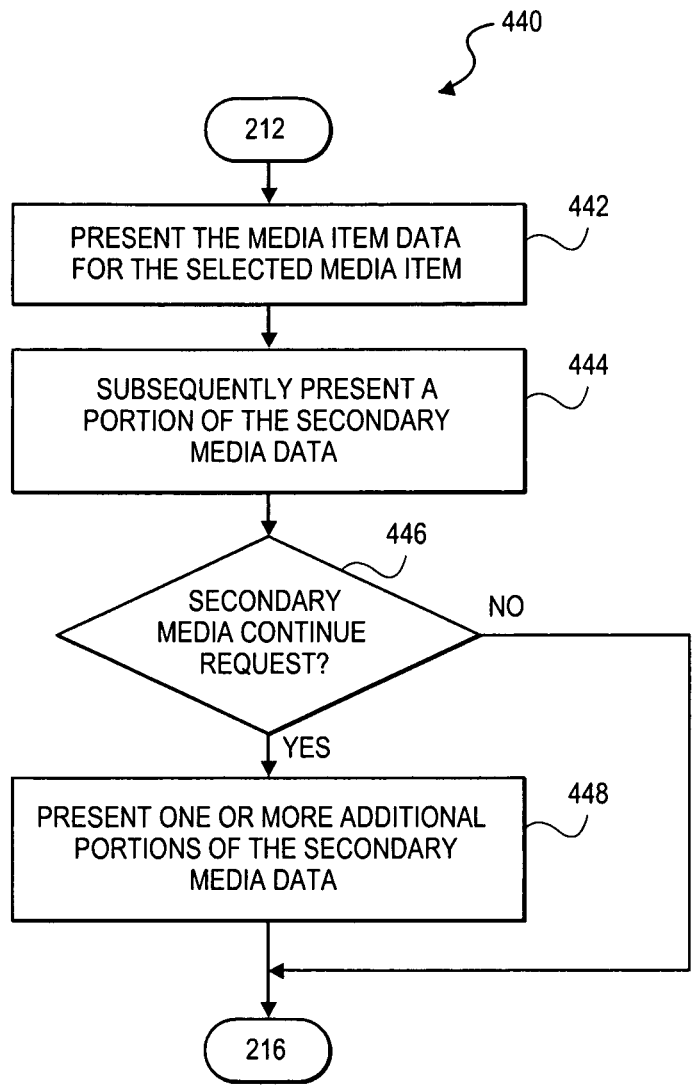
FIG. 4C is a flow diagram of a media presentation process according to still another embodiment of the invention.

FIG. 4C is a flow diagram of media presentation process 440 according to still another embodiment of the invention. Media presentation process 440 can be, for example, a process performed by block 214 of media playback process 200 illustrated in FIG. 2. Media presentation process 440 can initially present 442 the media item data for the selected media item. Next, a portion of the secondary media data can be presented 444. Decision 446 can determine whether a secondary media continue request has been provided. In one embodiment, the secondary media continue request would be initiated by a user of the computing device. As an example, the user of the computing device could signal their desire that the presentation of secondary media continue using a user input device associated with the computing device. In one implementation, the user could provide a user input while the portion of the secondary media data is being presented 444 to thereby initiate the secondary media continue request. When decision 446 determines that a secondary media continue request has been received, then one or more additional portions of the secondary media data are presented 448. In this case, the secondary media can continue to be presented if the user of the computing device provides or initiates the secondary media continue request.

On the other hand, when decision 446 determines that there has been no secondary media continue request, then block 448 can be bypassed such that the presentation of secondary media data does not continue. In such case, the presentation of media item data and a portion of the secondary media data can continue to alternate. Following block 448, or its being bypassed, media presentation process 440 can end and processing can return to block 216 of media playback process 200.

Additionally, any of media presentation processes 400, 420 or 440 can utilize a transition effect when transitioning between presentation of media item data and secondary media data. One example of a transition effect is a cross-fade. The presentation of media item data and secondary media data can also involve mixing of such data, with or without transition effects.

FIG. 5A is a diagram of conventional playback of a media group 500. Media group 500 in this example has five (5) media items, namely, first media item 502, second media item 504, third media item 506, fourth media item 508 and fifth media item 510. The playback of media group 500 operates to sequentially play media items 502-510. For example, initially first media item 502 is played. After the playback of first media item 502 has completed, second media item 504 is played. After the playback of second media item 504 has completed, third media item 506 is played. After the playback of third media item 506 has completed, fourth media item 508 is played. After the playback of fourth media item 508 has completed, fifth media item 510 is played. After the playback of fifth media item 510 has completed, the playback of media group 500 is complete.

FIG. 5B is a diagram of secondary media package 520 according to one embodiment of the invention. Secondary media package 520 can pertain to one or more secondary media items. As shown in FIG. 5B, secondary media package 520 is divided into portions. In this example, secondary media package 520 has five (5) portions, namely, first portion 522, second portion 524, third portion 526, fourth portion 528 and fifth portion 530. The portions can also be referred to as segments (e.g., segmented into segments).

FIG. 5C is a diagram of playback of interlaced media data 540 according to one embodiment of the invention. After playback of each of the media items in media group 500 are played, a particular portion of the secondary media can be played from secondary media package 520. In other words, playback of the segments of secondary media package 520 are alternated with playback of the media items of media group 500. In the example illustrated in FIG. 3C, first media item 502 can be initially played. After the playback of first media item 502 has completed, first portion 522 of secondary media package 520 can be played. After the playback of first portion 522 has completed, second media item 504 can be played. After the playback of second media item 504 has completed, second portion 524 of secondary media package 520 can be played. After the playback of second portion 524 has completed, third media item 506 can be played. After the playback of third media item 506 has completed, third portion 526 of secondary media package 520 can be played. After the playback of third portion 526 has completed, fourth media item 508 can be played. After the playback of fourth media item 508 has completed, fourth portion 528 of secondary media package 520 can be played. After the playback of fourth portion 528 has completed, fifth media item 508 can be played. After the playback of fifth media item 510 has completed, fifth portion 530 of secondary media package 520 can be played. After the playback of fifth portion 530 has completed, the playback of interlaced media data 540 can be complete.

FIG. 5D is a diagram of playback of interlaced media data 560 according to another embodiment of the invention. Interlaced media data 560 can be similar to interlaced media data 540 illustrated in FIG. 5C, except that interlaced media data 560 further includes transition effects at transitions between media items 502-510 of the media group and portions 522-530 of secondary media package 520. One example of a transition effect is a cross-fade. FIG. 5D illustrates first cross-fade 562 at a transition from first media item 502 and first portion 522 of secondary media package 520, and second cross-fade 564 at a transition from first portion 522 and second media item 502.

FIG. 5E is a diagram of playback of mixed media data 570 according to one embodiment of the invention. The playback of the mixed media data being like interlaced media data 540 illustrated in FIG. 5C. However, during the playback of second portion 524 of secondary media package 520, a user can request to continue with playback of the secondary media. In this example, point 572 indicates when the user request was made. In response to the user request, remaining portions 526-530 are played back in an adjacent manner. Following the playback of remaining portions 526-530, the remaining media items in media group 500 are played. In particular, the remaining media items in this example are third media item 506, fourth media item 508 and fifth media item 510.

FIG. 5F is a diagram of playback of mixed media data 580 according to another embodiment of the invention. In this embodiment, secondary media package 520 is played back in its entirety prior to playing back any of the media items of media group 500. In other words, after each of portions 522-530 of secondary media package 520 are played, media items 502-510 of media group 500 are sequentially played.

Another aspect of the invention pertains to selection, retrieval and update of auxiliary media to be presented. The selection can be determined based on one or more criterion. The retrieval can be from auxiliary media that is locally available. Auxiliary media can be maintained at a central media repository, and media devices can access the media repository via a network to acquire auxiliary media. Additionally, auxiliary media that has been previously acquired from the media repository can be refreshed or updated by subsequent access to the media repository. For example, a remote media repository can provide updated or refreshed auxiliary media data to a computing device over a network. As result, the computing device is able to present auxiliary media data that has been refreshed or updated. In one example, the auxiliary media data can pertain to advertising. Advertising information can pertain to specific products, services, shows or events. When advertising is able to be refreshed or updated, improved advertising results can be achieved. In another example, the auxiliary media data can pertain to news. When news is able to be refreshed or updated, the news available to the computing device can remain current.

Figure 6A:
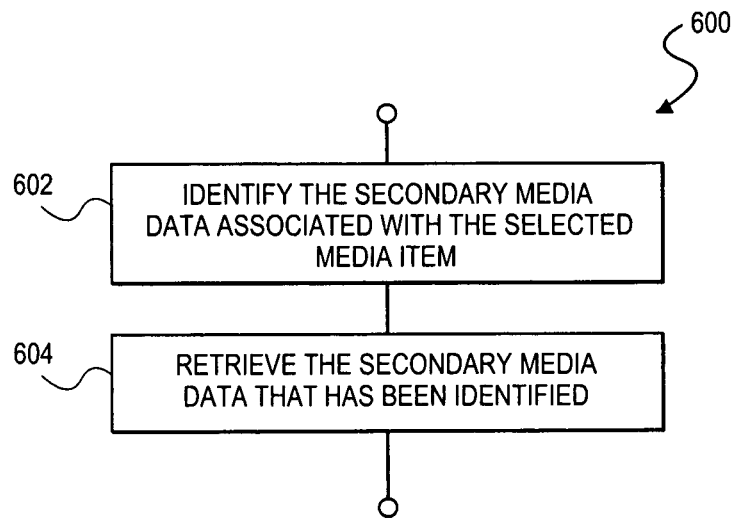
FIG. 6A is a flow diagram of a media retrieval process according to one embodiment of the invention.

FIG. 6A is a flow diagram of media retrieval process 600 according to one embodiment of the invention. Media retrieval process 600 is, for example, processing that can be performed by block 212 of media playback process 200 illustrated in FIG. 2. Media retrieval process 600 identifies 602 the secondary media data associated with the selected media item. Then, the secondary media data that has been identified can be retrieved 604. Accordingly, media retrieval process 600 operates to identify and retrieve the secondary media data that is to be utilized (namely, presented) with the media data item at block 214 of media playback process 200. In one implementation, the selected media item may include a link, pointer or other reference to the secondary media data that is associated with the selected media item. In another implementation, a database can associate the secondary media data with the selected media item.

Figure 6B:
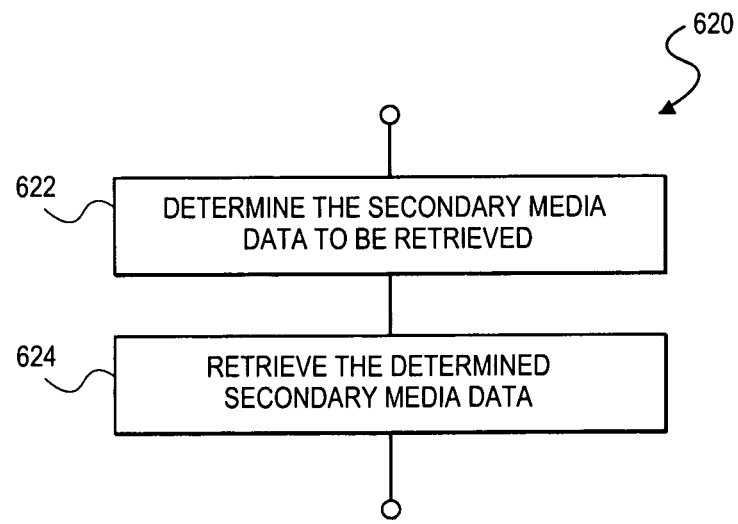
FIG. 6B is a flow diagram of a media retrieval process according to another embodiment of the invention.

FIG. 6B is a flow diagram of media retrieval process 620 according to another embodiment of the invention. Media retrieval process 620 is, for example, processing that can be performed by block 212 of media playback process 200 illustrated in FIG. 2. Media retrieval process 600 determines 622 the secondary media data to be retrieved. Determination 622 of the secondary media data to be retrieved can be based on one or more of a variety of different criteria. For example, the secondary media data to be retrieved can be determined 622 based on one or more of: (i) the selected media item, (ii) a random characteristic, (iii) prior usage or user history, (iv) user preferences, (v) third-party preferences, (vi) keywords, (vii) advertising preferences, etc. In any case, after the secondary media data to be retrieved has been determined 622, the determined secondary media data can be retrieved 624.

Figure 7:
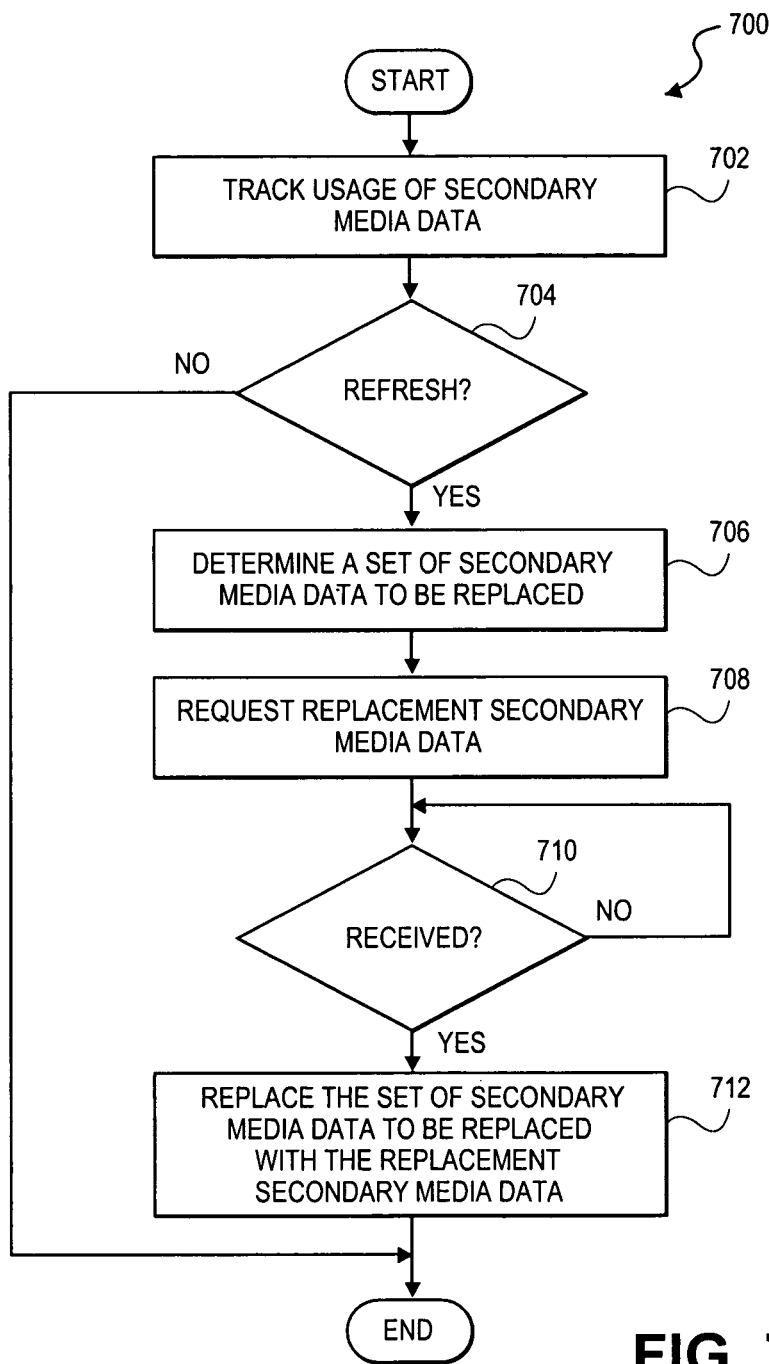
FIG. 7 is a flow diagram of a secondary media data refresh process according to one embodiment of the invention.

FIG. 7 is a flow diagram of secondary media data refresh process 700 according to one embodiment of the invention. Secondary media data refresh process 700 can be, for example, a process to refresh or update secondary media data that is to be utilized. For example, the secondary media data being refreshed or updated can be used with server system 100 illustrated in FIG. 1 or media playback process 200 illustrated in FIG. 2. For example, client device 104 and/or portable electronic device 110 can have at least a portion of their secondary media data updated or refreshed.

Secondary media data refresh process 700 tracks 702 usage of secondary media data. Here, the computing device that presents the secondary media data monitors or tracks 702 usage of the secondary media data. Next, decision 704 can determine whether the secondary media data should be refreshed at this time. In one implementation, the secondary media data can be refreshed or updated on a periodic basis. In another implementation, the secondary media data can be refreshed or updated based on use. When decision 704 determines that the secondary media data should not be refreshed at this time, secondary media data refresh process 700 can end.

On the other hand, when decision 704 determines that the secondary media data should be refreshed at this time, a set of secondary media data to be replaced can be determined 706. Determination 706 can, for example, be influenced by the usage of the secondary media. Next, replacement secondary media data is requested 708. As an example, the replacement secondary media data can be requested from a media repository (e.g., auxiliary media server 112). Thereafter, decision 710 determines whether the replacement secondary media data has been received. When decision 710 determines that the replacement secondary media data that has been requested 708 has not been received, secondary media data refresh process 700 awaits receipt of such data. Once decision 710 determines that the requested replacement secondary media data has been received, the set of secondary media data is replaced 712 with the replacement secondary media data. Following block 712, secondary media data refresh process 700 ends.

Still another aspect of the invention pertains to restricting presentation of primary media by an electronic device unless auxiliary data is also presented.

In one embodiment, an electronic device can be designed or configured to require the presentation of auxiliary data. Auxiliary data might be media, such as advertisements or news, that the user of the electronic device might not be interested in hearing or viewing. As such, designing or configuring the electronic device to require presentation of auxiliary data ensures that a certain portion of its usage will present auxiliary data to its user. In another embodiment, an electronic device could be designed or configured to require that auxiliary data be periodically refreshed so that advertisements or news information are not stagnant.

In one embodiment, since presentation of auxiliary data can be ensured, the cost to the user for an electronic device can be lowered. For example, the ability for advertisements or news to generate revenue can be used to offset the cost for the electronic device. For example, the presentation of auxiliary data can be used to subsidize the cost for the electronic device.

In still another embodiment, an electronic device could be designed or configured to only play media items that have been purchased from an authorized provider, such as an authorized online media store. The media being purchased in this manner could also be denoted as requiring playback of auxiliary data by an electronic device. For example, whenever certain songs are provided from an authorized provided are to be played by an electronic device, the electronic device could integrate playing of auxiliary data with the playing of the songs. In this way, the songs might be able to be purchased at a reduced cost since auxiliary media playback is imposed.

Still another aspect of the invention pertains to providing or forming podcasts that are arranged or played in an integrated fashion. For example, segments of a podcast could be separated by segments of auxiliary media. In this regard, the segments of the podcast can be considered media items, and the auxiliary data can be interposed between the various segments.

Figure 8:
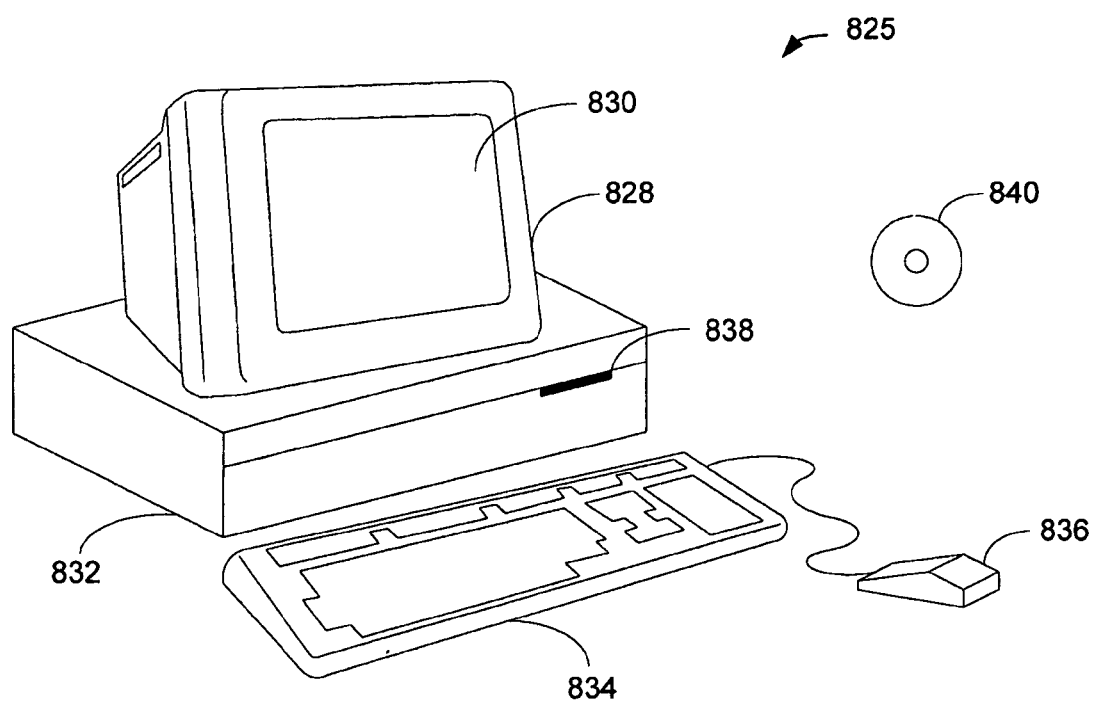
FIG. 8 shows an exemplary computer system suitable for use with one embodiment of the invention.

FIG. 8 shows exemplary computer system 825 suitable for use with one embodiment of the invention. Computer system 825 can, for example, represent client device 104 illustrated in FIG. 1. Computer system 825 can include display monitor 828 having single or multi-screen display 830 (or multiple displays), cabinet 832, keyboard 834, and mouse 836. Cabinet 832 can house drive 838, such as a CD-ROM or floppy drive, system memory and hard drive (not shown) which may be utilized to store and retrieve software programs incorporating computer code that implements the present invention, data for use with the invention, and the like. Although CD-ROM 840 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, computer program code can be provided in the system memory, the hard drive, CD-ROM 840 or other computer readable storage medium and can serve to at least partially implement the invention.

Figure 9:
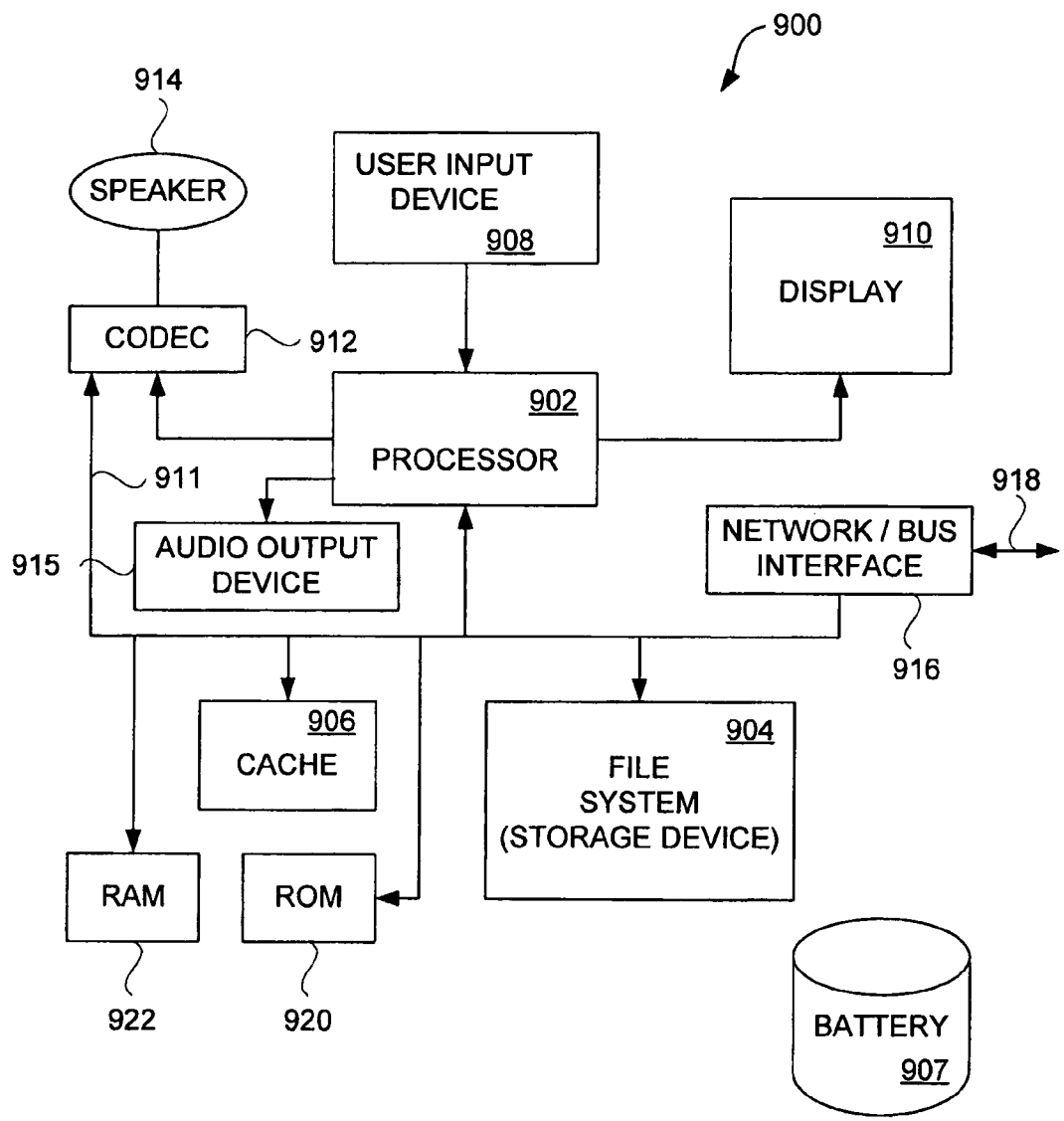
FIG. 9 is a block diagram of a media player according to one embodiment of the invention.

FIG. 9 is a block diagram of media player 900 according to one embodiment of the invention. Media player 900 can perform the operations described above with reference to FIGS. 2-7. Media player 900 is, for example, suitable for use as portable media device 110 illustrated in FIG. 1.

Media player 900 includes processor 902 that pertains to a microprocessor or controller for controlling the overall operation of media player 900. Media player 900 stores media data pertaining to media items in file system 904. Media player 900 also stores auxiliary media in file system 904. File system 904 is, typically, a storage device, such as a FLASH or EEPROM memory or a storage disk. File system 904 typically provides high capacity storage capability for media player 900. File system 904 can store not only media data (e.g., media item data and auxiliary media data) but also non-media data (e.g., when operated as a storage device). However, since the access time to file system 904 is relatively slow, media player 900 can also include cache 906 to provide data storage. Cache 906 is, for example, Random-Access Memory (RAM) provided by semiconductor memory. The relative access time to cache 906 can be substantially shorter than for file system 904. However, cache 906 does not have the large storage capacity of file system 904. Further, file system 904, when active, consumes more power than does cache 906. The power consumption is often a concern when media player 900 is a portable media player that is powered by battery 907. Media player 900 can also include RAM 920 and Read-Only Memory (ROM) 922. ROM 922 can store programs, utilities or processes to be executed in a non-volatile manner. RAM 920 provides volatile data storage, such as for cache 906.

Media player 900 can also include user input device 908 that allows a user of media player 900 to interact with media player 900. For example, user input device 908 can take a variety of forms, such as a button, keypad, dial, touch surface, etc. In one implementation, user input device 908 can be provided by a dial that physically rotates. In another implementation, user input device 908 can be implemented as a touchpad (i.e., a touch-sensitive surface). In still another implementation, user input device 908 can be implemented as a combination of one or more physical buttons as well as a touchpad. Still further, media player 900 can include display 910 (screen display) that can be controlled by processor 902 to display information to the user. Data bus 911 can facilitate data transfer between at least file system 904, cache 906, processor 902, and CODEC 912.

Media player 900 can also provide audio feedback. When audio feedback is triggered, the output of the audio feedback can be provided using audio output device 915. As an example, audio output device 915 can be a piezoelectric device (e.g., piezoelectric buzzer). Although the audio feedback is output from audio output device 915, in another embodiment, the audio feedback can be output from speaker 914.

In one embodiment, media player 900 serves to store a plurality of media items (e.g., songs) in file system 904. When a user desires to have the media player play a particular media item, a list of available media items can be displayed on display 910. Then, using user input device 908, a user can select one of the available media items. Audio feedback can be provided as the user scrolls the list of available media items and/or as the user selects one of the available media items. Processor 902, upon receiving a selection of a particular media item, supplies the media data (e.g., audio file) for the particular media item to coder/decoder (CODEC) 912. CODEC 912 then produces analog output signals for speaker 914. Speaker 914 can be a speaker internal to media player 900 or external to media player 900. For example, headphones, headset or earphones that connect to media player 900 would be considered an external speaker. An external speaker can, for example, removably connect to media player 900 via a speaker jack. Also, when auxiliary media is to be output, processor 902 supplies the media data for auxiliary media to CODEC 912. Processor 902 can control what, how and when the auxiliary media is to be supplied to CODEC 912. Processor 902 can also provide mixing or transition effects when outputting media data to CODEC 912 for media items and/or auxiliary media.

Media player 900 also includes network/bus interface 916 that couples to data link 918. Data link 918 allows media player 900 to couple to a host computer. Data link 918 can be provided over a wired connection or a wireless connection. In the case of a wireless connection, network/bus interface 916 can include a wireless transceiver.

In one embodiment, media player 900 can be a portable computing device capable of processing media such as audio and/or video. For example, media player 900 can be a music player (e.g., MP3 player), a video player, a game player, and the like. Media player 900 can also be a multi-function device, such as a mobile telephone (e.g., cell phone) or Personal Digital Assistant (PDA). These devices are generally battery operated and highly portable so as to allow a user to listen to music, play games or video, record video or take pictures wherever the user travels. In one implementation, media player 900 is a handheld device that is sized for placement into a pocket or hand of the user. By being handheld, media player 900 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to utilize and manage media assets. One example of a media management application is iTunes®, produced by Apple Computer, Inc.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Different aspects, embodiments or implementations of the invention may yield one or more of the following advantages. One advantage is that a media playback device can present not only media items but also auxiliary media. The auxiliary data can be automatically provided and integrated (e.g., interspersed) with playback of media items. The auxiliary media can be media such as advertisements or news. For example, advertisements can be audio or video (i.e., multimedia) commercials or promotional segments, and news can pertain to national news headlines, sports highlights, international news, local news, etc. Another advantage is that auxiliary data can be automatically delivered to a media playback device so as to remain current and effective. Still another advantage is that the manner by which auxiliary media is interjected in playback of media can be controllable, such as by: user selections, user preferences, user actions, media item content providers, auxiliary media content providers, online media store, or media playback device manufacturers. Yet still another advantage is that a media playback device can require playback of auxiliary media in order to playback media items.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method performed by a media playback device for presenting a media item having media item metadata, the media playback device having a user input device, the method comprising:
 receiving a playback request at the user input device to select at least one media item for playback;
 identifying appropriate auxiliary media data based at least in part on a defined association between the media item and the auxiliary media data;
 playing back the selected media item; and
 playing back a portion of the identified auxiliary media data, wherein the identified auxiliary media data comprises a plurality of portions, wherein the plurality of portions are configured to be played in a chronological order, and wherein playing back the portion of the identified auxiliary media data comprises playing back one of the plurality of portions according to the chronological order;
 wherein the auxiliary media data comprises sports information, news information, voice messages, or any combination thereof.

2. The method of claim 1, comprising not playing back the selected media item when the media playback device determines that playback of the auxiliary media data is required by the defined association and playback of the auxiliary media data is not enabled.

3. The method of claim 1, comprising playing back the selected media item when the media playback device determines that playback of the auxiliary media data is required by the defined association and playback of the auxiliary media data is enabled, then the playing back media items can be performed.

4. The method of claim 1, wherein the selected media item comprises a song, an audiobook, a podcast, or a video, or any combination thereof.

5. An apparatus, comprising:
 a processor configured to:
  receive a user request to play at least one media item having media item metadata, the media item and auxiliary media data being stored in the apparatus;
  identify appropriate auxiliary media data, wherein the identification is based at least in part on a defined association between the media item and the auxiliary media data;
  play back the requested media item;
  play a first portion of the auxiliary media data in accordance with the defined association, wherein the auxiliary media data comprises a plurality of portions, and wherein the auxiliary media data comprises sports information, news information, or voice messages, or any combination thereof; and
  play a second portion of the auxiliary media data upon receiving an input from the end-user when the first portion of the auxiliary media data is playing, wherein the second portion of the auxiliary media data is configured to follow the first portion of the auxiliary media data according to a sequential order.

6. The apparatus of claim 5, wherein the processor is configured to periodically update the auxiliary media data.

7. The apparatus of claim 5, wherein the processor is configured to play portions of the auxiliary media data interspersed with the media items when the input is not received.

8. The apparatus of claim 5, wherein the media item comprises a song, an audiobook, a podcast, a video, or any combination thereof.

9. A media playback device comprising:
 a user input device configured to receive an end user selection;
 a data storage device configured to store at least one media item having media item metadata and auxiliary media data;
 a media playback subsystem operatively connected to the data storage device, the media playback system operable to:
  receive a request from the user input device to play the media item from the data storage device;
  identify appropriate auxiliary media data, wherein the identification is based at least in part on a preference of a third-party that provides the auxiliary media data and a defined association between the media item and the auxiliary media data; and
  arrange and playback a portion of the auxiliary media data and media item in accordance with the defined association and a sequence, wherein the auxiliary media data comprises a plurality of portions ordered according to the sequence, wherein the auxiliary media data comprises sports information, news information, voice messages, or any combination thereof.

10. The media playback device of claim 9, wherein the media playback device is not operable to play back at least one of the media items unless the media playback device also plays back the auxiliary media data.

11. The media playback device of claim 9, wherein the media playback device comprises a mobile phone.

12. The media playback device of claim 9, wherein the media playback subsystem is operable to intersperse the auxiliary media with the playing of the media item.

13. The media playback device of claim 9, wherein the media item comprises a playlist having a defined auxiliary media data association.

14. A non-transitory computer readable medium including at least computer program code executable by a processor for presenting media by a media playback device, the computer readable medium comprising:
 computer code to receive a playback request to play a media item;
 computer code to identify appropriate auxiliary media data, wherein the identification is based on a random characteristic of the media item, a defined association between the media item and the auxiliary media data, user preferences, and advertising references;
 computer code to play back the media item; and
 computer code to play back the identified auxiliary media data in accordance with the defined association.

15. The non-transitory computer readable medium of claim 14, wherein the media item comprises a song, an audiobook, a podcast, a video, or any combination thereof.

16. The non-transitory computer readable medium of claim 14, wherein the defined association stops auxiliary media data from being played back when the media item metadata has a specific attribute which prohibits the playback of auxiliary media data.

17. A method performed by a media playback device for presenting a media item having media item metadata, the media playback device having a user input device, the method comprising:
 receiving a playback request at the user input device to select at least one media item for playback;
 identifying appropriate advertising media data based at least in part on a defined association between the media item and the advertising media data;
 playing back the selected media item; and playing back a portion of the identified advertising media data, wherein the identified advertising media data comprises a plurality of sequentially ordered portions, wherein the portion of the identified advertising media data is played back according to an order of the plurality of sequentially ordered portions.

\* \* \* \* \*